United States Patent [19]

Hau et al.

[11] Patent Number: 4,851,236

[45] Date of Patent: Jul. 25, 1989

[54] METHOD OF ACCELERATING THE RIPENING OF CHEESE

[76] Inventors: Jann Hau, Roskilde; Otto M. Poulsen, Rødovre, both of Denmark

[21] Appl. No.: 124,110

[22] Filed: Nov. 10, 1987

[30] Foreign Application Priority Data

Mar. 11, 1986 [DK] Denmark .............................. 1103/86

[51] Int. Cl.$^4$ ............................................. A23C 19/14
[52] U.S. Cl. ..................... 426/36; 426/237; 426/244
[58] Field of Search ................... 426/38, 36, 237, 244, 426/247

[56] References Cited

U.S. PATENT DOCUMENTS 1,774,610  9/1930  Parsons et al. .
2,848,400  8/1958  Meier et al. .

OTHER PUBLICATIONS

Kosikowski et al., "The Pasteurization of American Cheddar Cheese by Radio-Frequency Heat", J. Dairy Sci. Sep. 1949; pp. 790–795.

Commonwealth Agricultural Bureaux, CAB Abstract No. 0 085 360 ODO35-00996, Przemysl Spozywcy 1972, 26(9), 399–402, (Polish).

*Primary Examiner*—Marianne Cintins
*Attorney, Agent, or Firm*—Foley & Lardner, Schwartz, Jeffery, Schwaab, Mack, Blumenthal & Evans

[57] ABSTRACT

A method of accelerating the ripening of cheese is disclosed wherein cheese is placed in an electric field during part of the ripening process. During the ripening process, the direction of the electric field is changed at a constant or varying frequency during the entire course of the ripening process.

5 Claims, 5 Drawing Sheets

METHOD OF ACCELERATING THE RIPENING OF CHEESE

BACKGROUND OF THE INVENTION

This invention relates to a method of accelerating the ripening of cheese and an apparatus to be used in that respect.

As regards conventional cheese ripening carried out at temperatures of from 10° to 20° C. the ripening period is from a few weeks to several months dependent on the type of cheese. Long ripening periods imply that cheese producers must invest huge economical resources in the cheese products, large and expensive storage capacity is required and the cheese products necessitate protracted care. The longer the ripening period is, the more the costs of cheese production increase, entailing that there are internationally big economical interests in reducing the ripening period when producing cheese.

Therefore, extensive researches are today being instituted into cheese ripening acceleration. Such research concentrates primarily on the increase of the ripening temperature or on the selection and production of protease systems which, when added to the curd, are capable of increasing the rate of the proteolytic decomposition of casein, thereby increasing the ripening rate.

The ripening temperature of a certain type of cheese is decisive for the characteristics of the completed cheese, in that a constant temperature offers the best ripening quality and, consequently, an increase of the ripening temperature of such a type of cheese involves the risk that the ripening cheese has characteristics differing from those desired.

The increase of the protease concentration in the curd results in the following disadvantages:

the added proteases have a tendency to impart undesired flavours to the cheese, such as bitter peptides, the cheese ripening controlling becomes more difficult, and due to the high content of protease the ripened cheese products get soon overripe, i.e. the period during which the cheese can be consumed is shortened and the cheese products should therefore be distributed, sold and consumed within a very short period compared to conventionally ripened cheese.

Moreover, DE Pat. No. 950,104 discloses a method of accelerating cheese ripening, according to which the cheese is subjected to ultra-sound. This method is inter alia said to effect that the ultra-sound cause the cell membranes of bacteria to be destructed so as to liberate inter alia endoenzymes which increase the rate of ripening. An increased concentration of enzymes is thus obtained which involves the same drawbacks as described above.

Thus, there is a large demand on a method of accelerating the cheese ripening, according to which method the ripe cheese possesses the same properties and characteristics as a cheese product of the same type ripened in a conventional manner and it is therefore the object of the invention to provide such a method.

SUMMARY OF THE INVENTION

It has now proved that this is obtained by the method according to the invention which is characterized in that the cheese product at least during part of the ripening process is placed in an electric field the direction of which is being changed at a constant or varying frequency during the entire course of this part of the ripening process.

The accelerating effect of the method according to the invention is supposed to be due to the fact that the charged proteases and product peptides of the cheese move differently in comparison with the stationary integral casein network in the electric field. The proteases thus get rapidly into contact with new areas of the casein network and the generated product peptides acting inhibiting on the proteases are quickly removed therefrom, in contradiction to what happens under normal ripening conditions without electric field, in which case the peptide products are only removed from the proteases by diffusion, thereby creating a gradient of product peptides around the proteases.

When this processing in an electric field is interrupted the migration of the proteases and the product peptides will again take place by pure diffusion and the ripening rate and thus the period of distribution, sales and consuming will then be the same as with the same type of cheese ripened without being placed in an electric field having varying direction.

In view of the fact that the remaining ripening conditions, such as temperature, moisture of the atmosphere, the composition of the curd, care, and so on, may be the same during ripening accelerated by the method according to the invention as during ripening under conventional conditions, cheese products are thus obtained that are identical with corresponding cheese products ripened in the ordinary way. Neither does any difference appear between the product peptides generated during ripening, accelerated according to the invention and under conventional conditions, respectively.

DETAILED DESCRIPTION OF THE PREFERRED EMBODIMENTS

Figure 1:
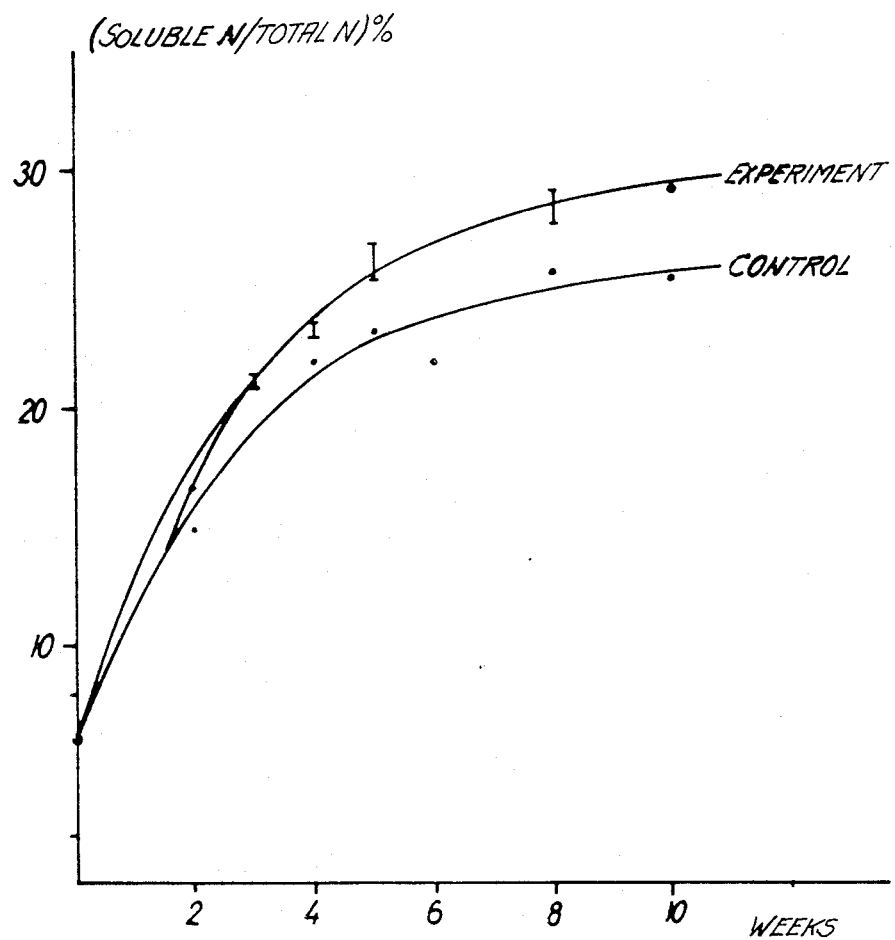
FIG. 1 illustrates the ratio between soluble N and total N as a function of the elapsed ripening period.

The accelerating effect of the method according to the invention is a function of the electric field strength, the type of cheese and the frequency of changing the direction of the field.

The field strength may be in the range from 0.05 Volt/cm to 10 Volt/cm dependent on the type of cheese and the desired accelerating effect etc. Generally, a greater accelerating effect is obtained, the greater the field strength is. The maximum field strength depends on whether it is possible to eliminate the heat generated in the cheese body, thereby avoiding an undesired temperature increase.

The frequency of changing the direction of the field may range from one change of direction every 0.1 sec. to 24 hours. By changing the direction of the field it is obtained that no peptides, no amino acids, no proteases, no salts or any other charged particles at the electrodes are lost and that no uneven distribution of said substances is effected in the cheese body.

The limits for the frequency are settled by the circumstance that, on one hand, it must be so high that no losses are provoked at the electrodes and no inhomogeneity occurs and, on the other hand, so low that product peptides and proteases are in a position to migrate away from each other. The higher the field strength is, the higher the frequency may thus be.

By ensuring that the field strength is constant in any plane perpendicular to the electric field through the cheese body, the same acceleration of the cheese ripening throughout the cheese is to the largest possible extent obtained.

The optimum conditions with respect to field strength and the frequency of changing the direction of the field may be determined by simple experiments with the individual cheese products and further by given conditions relating to experiments.

The field strength is provided by means of two oppositely located electrodes on either side of the cheese body and in communication with part of or with the entire surface of each individual side of the cheese body, a potential difference being applied across the electrodes. The direction of the field is changed by changing the potentials of the electrodes.

The temperature may be in the range from 5° to 30° C., preferably the temperature to be used in conventional ripening of the same cheese.

The temperature of the cheese body may be regulated according to any method, but it is preferred to control it by means of the electrodes used to provide the electric field by air- or water-cooling thereof, for instace in combination with controlling the room temperature.

In a preferred embodiment of the method according to the invention of accelerating the ripening of cheese bodies having at least two substantially parallel lateral surfaces, the electric field is provided by disposing the two electrodes oppositely so as to be in contact with substantially the entire surface of either of the two sides, and by applying an electric potential difference across said two electrodes by connecting them to a direct current source comprising a pole changer. The preferred embodiment may for instance imply that a number of cheese bodies be superposed and that alternatively positive and negative electrodes be inserted between the cheese bodies. This embodiment provides for obtaining a substantially homogeneous electric field throughout the cheese bodies and thereby a cheese ripening as homogeneously as possible.

The electrodes used in the method according to the invention may be produced from any conventional electrode material, but it is preferred to make use of such electrodes that do not release metallic ions or metal on alternative curd moulds, since such a generation may influence the flavour of the cheese and since such metals frequently are toxic.

In view of the above it is preferred to produce the practised electrodes from non-metalic conductive materials, such as conductive ceramic materials, carbon and conductive materials made from charged organic polymers or metallic conductors coated with such a non-metallic conductive material preventing metallic ions from being imparted to the curd.

It has now proven that by arraning ion-selective membranes (e.g. of the type HR98, trade of DE DANSKE SUKKERFABRIKKER, DDS-RO Division, Denmark) between steel electrodes and cheese bodies, it is effectively avoided that metal be imparted to the cheese. The acceleration of the cheese ripening may for instance be effected in an apparatus comprising two oppositely located electrodes which may for instance be subjected to water- or air-cooling and have a surface that does not impart metal ions or metal in any other form, and a direct current source adapted so that the direction of the electric field provided across the electrodes may be changed at constant or varying frequency and so that the numeric value of the field strength may be varied.

Electrical processing has previously been practised in respect of cheese production.

U.S. Pat. No. 1,774,610, issued Sept. 2, 1930, discloses a process of pasteurizing cheese, according to which an electric field is passed for a while through the cheese in solid, plastic condition, thereby heating the cheese. The potential difference is stated to range from 30 to 220 volts and the average current density varies from one-half to 10 amperes per $cm^2$.

U.S. Pat. No. 2,848,400, issued on Aug. 19, 1958, discloses a process of preventing cheese from adhering to a cheese mould made from stainless steel, in which a negative potential in relation to the electrical potential of the milk is applied to the container, entailing alkaline reactions to occur at the container wall (cathode) and, consequently, no solidification is then effected.

Said two processes differ totally from the method according to the invention and have quite other purposes.

In contradiction to the process according to U.S. Pat. No. 1,774,610 it is, as mentioned above, important in the method according to the invention that the temperature is kept at the usual temperature of a corresponding cheese conventionally ripened, if necessary by cooling by means of the electrodes. The practised field strength is moreover considerably lower than that used in the method according to the invention.

Alcaline reactions at the electrodes are as well undesired in the method according to the invention, as described above. The purpose of changing the field and of ensuring that the electrodes do not release metal is to avoid reactions at the electrodes.

The method according to the invention may be used in the preparation of any general kind of cheese, apart from moulded cheese, since protease added exogenously to the curd (cheese ripening enzymes) may further be added to the cheese beyond the rennet enzymes added in the conventional cheese production.

By a suitable choice of temperature, field strength and the frequency at which the electric field changes, a rapid ripening without deteriorated quality of the final cheese product is thus obtained by the process according to the invention.

The invention will be elucidated in detail by the following examples.

EXAMPLE 1

A newly salted cheese product of the type 45% Danbo having the following dimensions, 8 cm×30 cm×30 cm, is horizontally placed between two water-cooled, stainless steel electrodes. During a four-week ripening period a constant coolant temperature of 15° C. is practised, a constant current density of 50 mA and a constant pole changer frequency of eight direction changes per 24 hours. After a four-week ripening period the cheese product was obtained that at a visual and organoleptic assessment showed a ripening degree exceeding that of a corresponding cheese conventionally ripened at 15° C. for twelve weeks.

EXAMPLE 2

10 fresh cheese bodies of 5 kg having a crosssectional area of 900 cm² and a height of 8 cm is ripened under the influence of a constant potential difference of 1.5 V at a temperature ranging from 17° to 18° C. for three weeks at 95% relative humidity (RF), then at a temperature ranging from 13° to 14° C. and 85% RF for two weeks and finally at a temperature of 10° C. and 70% RF for five weeks. Two plates of stainless steel were used as electrodes. The current intensity was in the range from 25 to 40 mA during the entire ripening period, and the current direction was changed by means of a pole changer once every four hours. Samples were weekly taken for chemical analysis and bacteriological analyses were carried out after week 0 and 10.

5 fresh cheese bodies of the same time we used as control cheese, they were subjected to the same processing as mentioned above, however, without the impression of a potential difference.

As far as each individual sample is concerned the percentage of solids, the percentage of total-nitrogen, free N-terminal groups, the pH-value, the protein content and the content of soluble protein were measured after 1, 2, 3, 4, 5, 6, 8 and 10 weeks. After ten weeks the content of lactose, ashes and amino-N was measured.

The results of the analyses appear from FIGS. 1 to 4, in which

Figure 2:
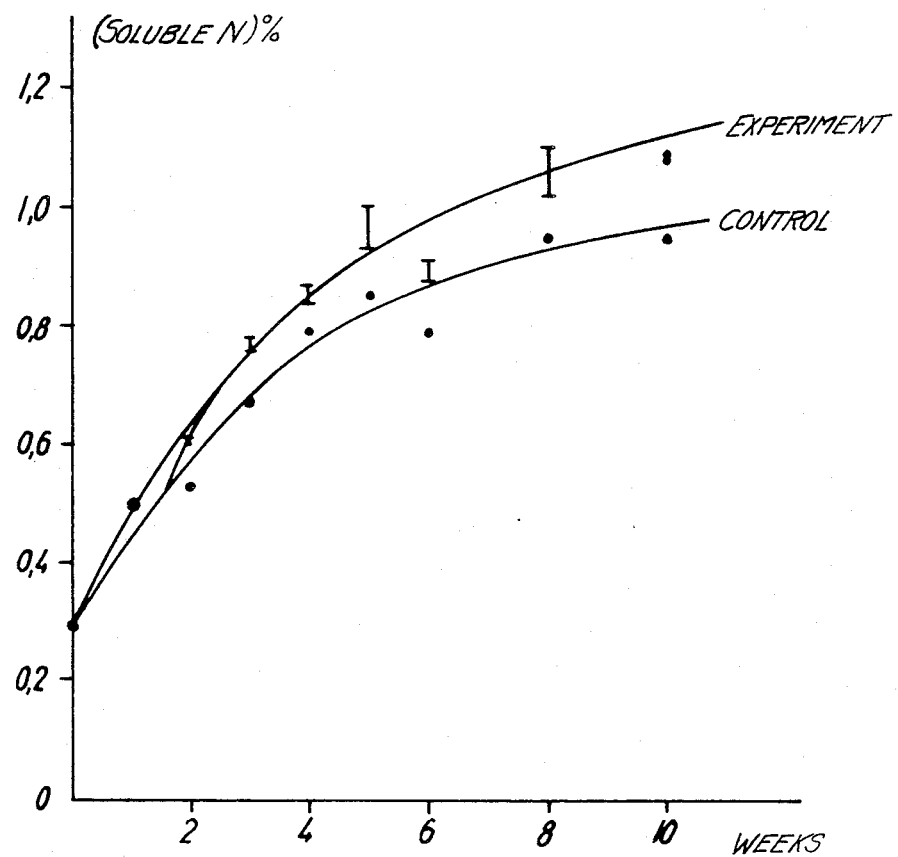
FIG. 2 illustrates the content of soluble N as a function of the elapsed ripening period.

FIG. 1 illustrates the ratio between soluble N and total N as a funtion of the elapsed ripening period, FIG. 2 illustrates the content of soluble N as a function of the elapsed ripening period.

Figure 3:
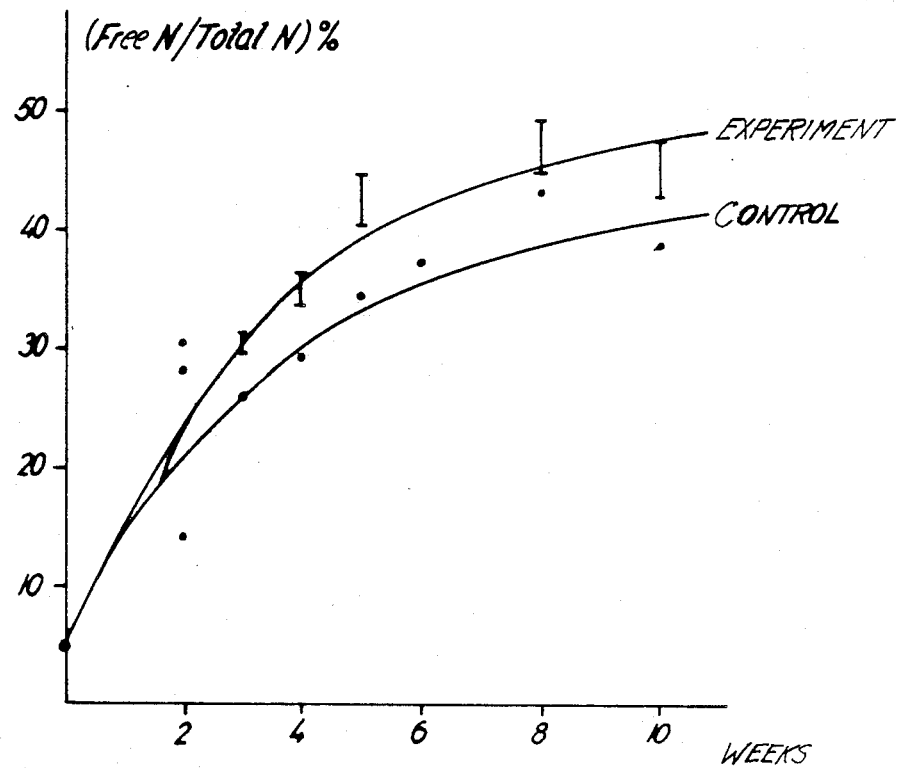
FIG. 3 illustrates the ratio between free N-terminal groups and total N as a function of the elapsed ripening period.
Figure 4:
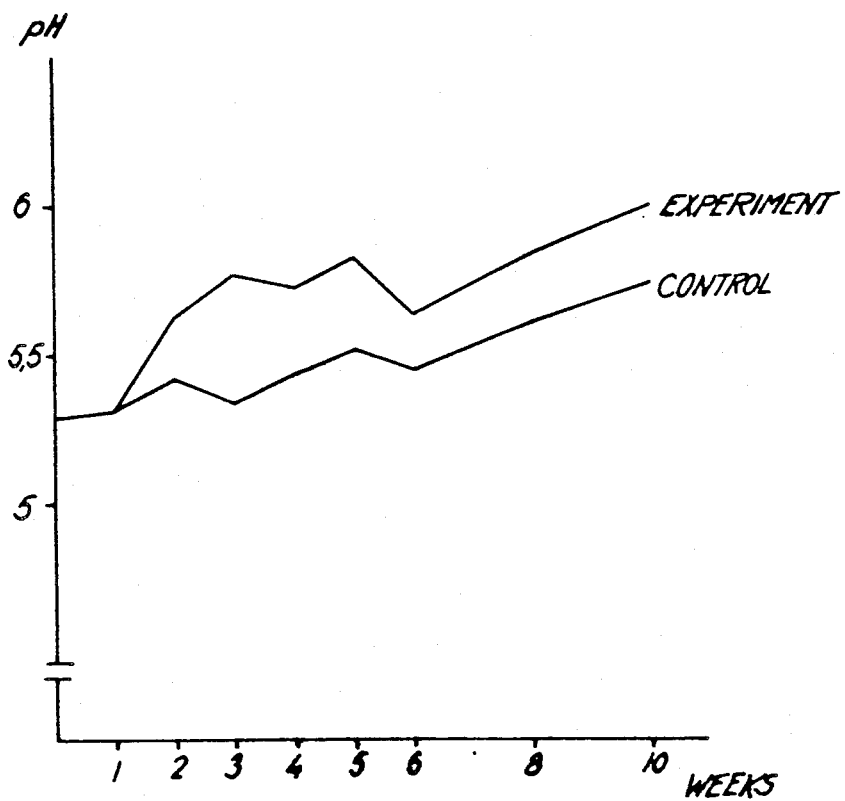
FIG. 4 illustrates the development of the pH-value during the ripening period.

FIG. 3 illustrates the ratio between free N-terminal groups and total N as a function of the elapsed ripening period, and FIG. 4 illustrates the development of the pH-value during the ripening period.

Figure 5:
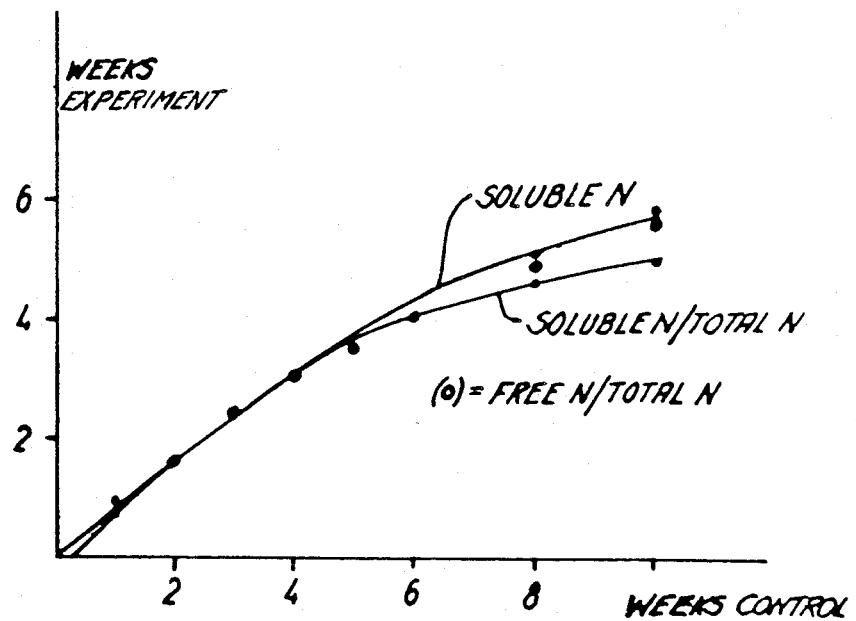

It appears from these figures that the processing by the method according to the invention offers a considerable accelerating of the ripening process, in particular during the first weeks thereof. The results are resumed in FIG. 5 illustrating the ripening period $V_P$ of the experimental cheese products as a function of the ripening period, $V_K$, of the control cheese. This curve has been drafted by reading, for a given ripening period $V_K$ of the control cheese, the attained value in any one of the FIGS. 1 to 3, subsequently reading the time it takes before the experimental cheese products attain said value. It will be seen that within the first five weeks $V_P 25\ 0.75\ V_K$, following which the difference grows progressively, so that $V_P = 0.6 \times V_K$ after ten weeks.

We claim:

1. A method of accelerating the ripening of cheese, wherein cheese, at least during part of the ripening process, is placed in an electric field having a field strength with a numerical value from 0.05 volt/cm to 10 volt/cm, the direction of which is being changed at a constant or varying frequency during the entire course of said part of the ripening process, said frequency of changing the direction of the field is in the range from one change of direction every 0.1 sec. to 24 hours, and wherein said cheese has a temperature which is kept in the range from about 5° to about 30° C.

2. A method as claimed in claim 1 wherein the electric field has a field strength which is substantially constant throughout any cut through the cheese perpendicular to the direction of the electric field.

3. A method as claimed in claim 1 wherein the temperature of the cheese is controlled by liquid- or air-cooled electrodes.

4. A method as claimed in claim 1 of accelerating the ripening of cheese products having at least two substantially parallel lateral surfaces, wherein the electric field is provided by oppositely arranging two electrodes, so that they are in communication with substantially the entire surface of either of two parallel sides, and by applying a potential difference across said two electrodes by connecting them to a direct-current source provided with a pole changer, and that the direction of the field is changed at constant or varying frequency by changing the direction of the current by means of the pole changer.

5. A method as claimed in claim 1, wherein an ion-selective membrane is inserted between the surface of the electrodes and the curd.

* * * * *